(12) United States Patent
Kimura et al.

(10) Patent No.: US 6,689,512 B2
(45) Date of Patent: Feb. 10, 2004

(54) FLAT-SHAPED NONAQUEOUS ELECTROLYTE BATTERY

(75) Inventors: Takashi Kimura, Miki (JP); Tatsuya Shigeno, Ono (JP); Kenichi Sano, Miki (JP)

(73) Assignee: Hitachi Maxell Ltd., Osaka (JP)

( * ) Notice: Subject to any disclaimer, the term of this patent is extended or adjusted under 35 U.S.C. 154(b) by 141 days.

(21) Appl. No.: 10/121,297

(22) Filed: Apr. 11, 2002

(65) Prior Publication Data

US 2002/0182492 A1 Dec. 5, 2002

(30) Foreign Application Priority Data

Apr. 11, 2001 (JP) ........................ 2001-112136
Jul. 30, 2001 (JP) ........................ 2001-229661

(51) Int. Cl.⁷ .......................... H01M 2/08; H01M 4/58
(52) U.S. Cl. ................... 429/185; 429/231.95
(58) Field of Search ................ 429/162, 164, 429/174, 185, 231.95

(56) References Cited

U.S. PATENT DOCUMENTS

2002/0026707 A1   3/2002   Yamasaki et al. .......... 29/623.2

FOREIGN PATENT DOCUMENTS

| JP | 59-151764 | * | 8/1984 |
| JP | 59-230258 | * | 12/1984 |
| JP | 60-095855 | * | 5/1985 |
| JP | 60-095857 | * | 5/1985 |
| JP | 3-276578 |   | 12/1991 |
| JP | 11-67282 |   | 3/1999 |
| JP | 2000-58131 |   | 2/2000 |

OTHER PUBLICATIONS

Patent Abstracts of Japan, Publication No. 03-276578 A, Publication Date Dec. 6, 1991, 1 page.
Patent Abstracts of Japan, Publication No. 11-067282 A, Publication Date Mar. 9, 1999, 1 page.
Patent Abstracts of Japan, Publication No. 2000-058131 A, Publication Date Feb. 25, 2000, 1 page.

* cited by examiner

Primary Examiner—Patrick Ryan
Assistant Examiner—Thomas H. Parsons
(74) Attorney, Agent, or Firm—Rosenthal & Osha L.L.P.

(57) ABSTRACT

A flat-shaped nonaqueous electrolyte battery including a sealing plate, a metal container, a gasket interposed between the sealing plate and the metal container, and a negative electrode, a positive electrode and a nonaqueous electrolyte that are sealed by pressing inward an edge portion of an opening of the metal container, the sealing plate also serves as a positive electrode terminal, the metal container also serves as a negative electrode terminal, and a peripheral portion of the negative electrode is arranged between an inner bottom surface of the metal container and the gasket is disclosed. It is preferable that a lithium alloy or an oxide of an element that can be alloyed with lithium is used for the negative electrode, and it is preferable that a ratio of a capacity of the negative electrode with respect to that of the positive electrode is at least 1.2.

9 Claims, 3 Drawing Sheets

FLAT-SHAPED NONAQUEOUS ELECTROLYTE BATTERY

BACKGROUND OF THE INVENTION

1. Field of the Invention

The present invention relates to a flat-shaped nonaqueous electrolyte battery such as a button-type nonaqueous electrolyte battery and a coin-type nonaqueous electrolyte battery. More specifically, it relates to a flat-shaped nonaqueous electrolyte battery that has a structure in which a sealing plate also serves as a positive electrode terminal and a metal container also serves as a negative electrode terminal, and achieves large capacity and excellent cycle characteristics as well as high reliability.

2. Description of Related Art

For both primary batteries and secondary batteries, nonaqueous electrolyte batteries having a flat shape such as a button shape and a coin shape are used widely as a main power source and a memory backup power source in various electronic appliances.

With a miniaturization of electronic appliances, the demand has shifted recently from conventional batteries having a diameter of about 10 to 20 mm to smaller batteries having a diameter of 8 mm or less.

Figure 5:
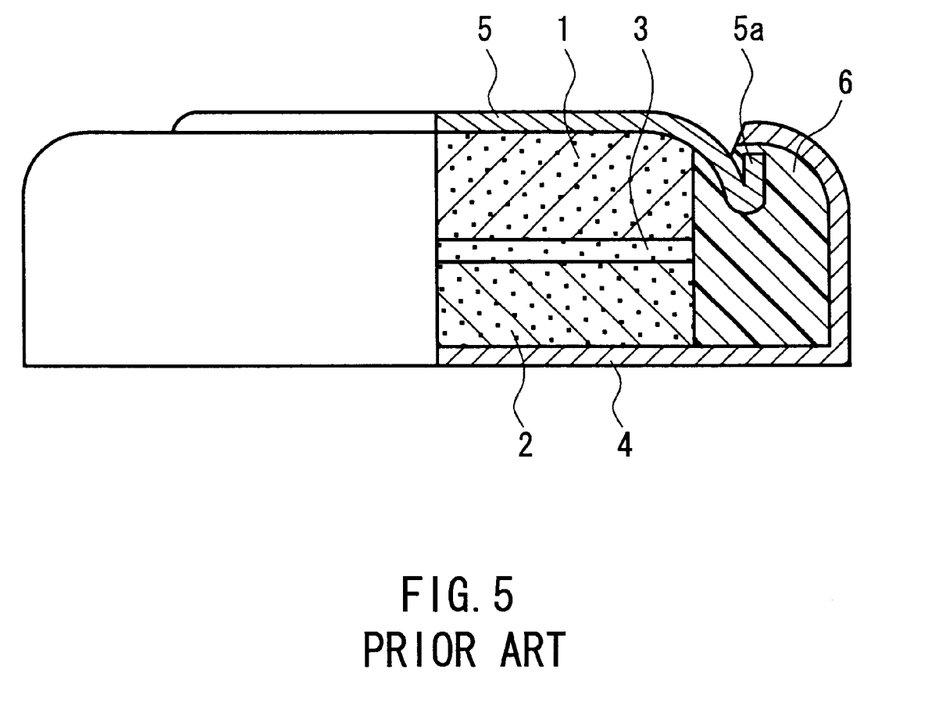
FIG. 5 schematically shows a partial cross-section of a flat-shaped nonaqueous electrolyte battery according to a prior art system corresponding to a conventional battery.

Conventionally, in such a flat-shaped nonaqueous electrolyte battery, as shown in FIG. 5, an edge portion of an opening of a metal container 4 serving as a positive electrode terminal tightly is pressed inward, so that the metal container 4, a sealing plate 5 serving as a negative electrode terminal and a gasket 6 seal in electric-power generating elements such as a negative electrode 1, a positive electrode 2 and a nonaqueous electrolytic solution obtained by dissolving a lithium salt in an organic solvent. Usually, the negative electrode 1 and the positive electrode 2 have substantially the same area, or the negative electrode 1 has an area smaller than the positive electrode 2 because the negative electrode 1 is arranged on the side of the sealing plate 5.

In the above-described flat-shaped nonaqueous electrolyte battery, the capacity of the battery is designed to be dependent mainly on the capacity of the positive electrode, while cycle characteristics of the battery is dependent mainly on the capacity of the negative electrode. Accordingly, the capacity and cycle characteristics of the battery are determined by a balance between the capacity of the positive electrode and that of the negative electrode. In conventional batteries with a diameter of about 10 to 20 mm, the capacity ratio of the negative electrode and the positive electrode is determined under the condition that both the electrodes have substantially the same area as described above, and these batteries have been designed such that the capacity and cycle characteristics of the battery both are satisfactory to a certain extent.

However, in conventional batteries having a relatively large diameter, there also has been a demand for still larger capacity while maintaining excellent cycle characteristics. Moreover, in the case of smaller batteries, when the size of the flat-shaped nonaqueous electrolyte battery with the above conventional structure is reduced, the volume ratio of elements other than the electric-power generating elements such as the gasket increases with respect to the entire battery. Accordingly, the decreasing rate of the effective volume inside the battery is larger than that of the volume inside the battery, causing a problem that a battery with a desired capacity cannot be designed. Furthermore, accompanying the miniaturization of batteries, the content of electrolytic solution is restricted. Thus, the cycle characteristics of the batteries have become further dependent on the capacity ratio of the positive electrode and the negative electrode, leading to a problem in that the adoption of the capacity ratio as in the conventional battery with a diameter of about 10 to 20 mm deteriorates the cycle characteristics considerably.

Attempts to reconcile these concerns have met with mixed success. The capacity ratio of the negative electrode may be raised by reducing the positive electrode ratio. However, the capacity of the battery decreases considerably, leading to a battery of little practical use. When the amount of the electrolytic solution is raised, the cycle characteristics improve but the electrolytic solution leaks easily. When the volume ratio of the gasket is reduced in order to secure the effective volume inside the battery, a problem arises in that a sealing performance by the gasket declines, leading to poor sealing characteristics.

SUMMARY OF THE INVENTION

In one aspect, the present invention provides a flat-shaped nonaqueous electrolyte battery that achieves large capacity, excellent cycle characteristics and leakproof characteristics as well as high reliability.

In one embodiment, the present invention has the following structure: a flat-shaped nonaqueous electrolyte battery includes a sealing plate, a metal container, a gasket interposed between the sealing plate and the metal container, and a negative electrode, a positive electrode and a nonaqueous electrolyte that are sealed by pressing inward an edge portion of an opening of the metal container. The sealing plate also serves as a positive electrode terminal, the metal container also serves as a negative electrode terminal, and a peripheral portion of the negative electrode is arranged between an inner bottom surface of the metal container and the gasket. With this structure, a flat-shaped nonaqueous electrolyte battery that achieves large capacity, excellent cycle characteristics and leakproof characteristics as well as high reliability is provided, thereby solving the above-mentioned problems.

Because the effect of the battery structure of the present invention increases with a decrease in a battery diameter, such a structure is used preferably in a battery having a diameter of 2 to 16 mm. In particular, the effect is significant in a small battery having a diameter of 2 to 8 mm.

DESCRIPTION OF THE PREFERRED EMBODIMENTS

The following is a specific description of an embodiment of the present invention.

Although the present invention includes a positive electrode arranged on a side of a sealing plate of a battery and a negative electrode arranged on a side of a metal container unlike the conventional flat-shaped nonaqueous electrolyte battery, a material for the sealing plate usually can be the same as that used for the metal container of the conventional flat-shaped nonaqueous electrolyte battery and a material for the metal container usually can be the same as that used for the sealing plate of the conventional flat-shaped nonaqueous electrolyte battery.

More specifically, the materials for these sealing plate and metal container can be stainless steel, copper, titanium, iron, nickel, aluminum, an alloy thereof, and a composite of a plurality of materials such as the one obtained by plating a surface of the above-described members or a clad plate of the above-described members. Furthermore, the above-described members optionally may be processed by annealing for the purpose of improving their workability and leakproof characteristics.

For the negative electrode, lithium, a lithium alloy, an oxide of an element that can be alloyed with lithium, a carbonaceous material and a nitride containing lithium can be used as an active material. In particular, a lithium alloy or an oxide of an element that can be alloyed with lithium are used preferably. Most preferably, a lithium alloy is used.

The lithium alloy can be an alloy of lithium and an element that can be alloyed with lithium, for example, aluminum, indium, lead, tin, silicon, magnesium, zinc, cadmium, bismuth, boron or antimony. It also is possible to use two or more of these elements at the same time, thereby forming at least a ternary alloy. In particular, an alloy containing at least one element selected from aluminum, tin and silicon is used preferably. Furthermore, in order to suppress deterioration of the negative electrode due to repeated charging and discharging and improve cycle characteristics, in the lithium alloy described above, other elements such as manganese, chromium, iron, tungsten, molybdenum, cobalt, nickel, zirconium, titanium or vanadium may be contained.

As the oxide of an element that can be alloyed with lithium, tin oxides such as SnO and $SnO_2$ and silicon oxides such as SiO and $SiO_2$, for example, can be used preferably. Of course, it may be an oxide obtained by substituting a part of elements constituting these oxides for other elements.

Furthermore, among transition metal oxides containing lithium, there also are oxides that can be used as an active material for negative electrode such as lithium-titanium oxides represented by $Li_xTi_yO_z$. In the case of the above-mentioned lithium-titanium oxides, an oxide where x=4/3, y=5/3 and z=4 is used preferably, and an oxide obtained by substituting a part of titanium for other elements also can be used.

The carbonaceous material can include materials that have been used widely as an active material for negative electrode of nonaqueous electrolyte batteries, for example, cokes, carbon fibers, mesocarbon microbeads and activated carbon, and graphitic materials such as natural graphite and artificial graphite.

The nitride containing lithium can be a composite nitride having constituent elements of lithium and a transition metal element such as cobalt, nickel, manganese, iron or vanadium. More specifically, a nitride containing cobalt or nickel such as $Li_{2.6}Co_{0.4}N$ can be used preferably. An oxynitride may also be used, and is obtained by substituting a part of nitrogen for oxygen.

Depending on the kind of active material for the positive electrode to be combined with, the oxide of an element that can be alloyed with lithium and a material that does not contain lithium such as the carbonaceous material among the above-mentioned materials to be the active material for negative electrode first may be supplied with lithium by an electrochemical method or a mechanical method and then used. Depending on the kind of an active material for positive electrode to be combined with, the materials containing lithium such as the lithium alloy and the nitride containing lithium first may be allowed to release lithium, contrary to the above. Alternatively, a material that does not contain lithium may be supplied with lithium in a later battery assembling process so as to form a desired chemical compound.

The above-mentioned materials for the active material for negative electrode may be used alone, or a plurality of them may be mixed or formed into a composite before using. Furthermore, as necessary, the materials for the active material for negative electrode can be combined with an electrically conductive base material such as a metal foil, a metal plate or a metal mesh, or mixed with a binder or an electrical conductivity auxiliary agent to be formed into a compact before using. As the binder, fluoroplastics such as polytetrafluoroethylene, polyvinylidene fluoride and tetrafluoroethylene-hexafluoropropylene copolymer, styrene resins such as styrene-butadiene copolymer, cellulose such as carboxymethyl cellulose, a polymer or copolymer of N-vinylacetoamide, or polyethylene terephthalate can be used preferably, for example. As the electrical conductivity auxiliary agent, scale-like graphite, acetylene black, carbon black and Ketjen Black can be used, for example.

The negative electrode is produced by using the material for the active material for negative electrode alone, forming an active material layer on an electrically conductive base material such as a metal foil or a metal plate, or forming a compact of a mixture with the binder etc., as described above. When a lithium alloy layer is formed on a metal plate so as to obtain a negative electrode, such a formation appropriately is carried out by, for example, bringing lithium into contact with the metal plate containing the above-mentioned element that can be alloyed with lithium such as aluminum or doping the metal plate with lithium electrochemically. At this time, the lithium alloy layer may be formed uniformly over an entire surface of the metal plate on the side facing the positive electrode. However, the lithium alloy layer formed on the peripheral portion of the metal plate is arranged between an inner bottom surface of the metal container and the gasket and does not face the positive electrode directly, and therefore, achieves a lower utilization factor than that formed in the central portion during charging and discharging. Also, since the formation of the lithium alloy layer brings about a volume increase, when an excessive lithium alloy layer is formed between the inner bottom surface of the metal container and the gasket, this may deform a sealing portion and impair sealing characteristics. Thus, by suppressing the formation of the lithium alloy layer in the peripheral portion of the metal plate and constructing the negative electrode so that the lithium alloy layer is thinner in this portion than in the central portion, it becomes possible to utilize the lithium alloy layer efficiently during charging and discharging and prevent the sealing characteristics from declining. Incidentally, the lithium alloy layer does not have to be formed in the peripheral portion of the metal plate as long as a necessary negative electrode capacity can be secured.

A method for suppressing the formation of the lithium alloy layer in the peripheral portion of the metal plate can include, for example, bringing lithium with a smaller diameter than the metal plate into contact with the metal plate. In this case, if a metal plate whose central portion is thinner than the peripheral portion is used, the movement of lithium toward the peripheral portion of the metal plate is suppressed, so that the formation of the lithium alloy layer in the peripheral portion can be suppressed effectively. The above-mentioned metal plate preferably is a metal plate whose central portion has a recessed part with a diameter that is 70% to 90% of an outer diameter of the metal plate. By bringing lithium into contact with this recessed part and forming a lithium alloy layer, the movement of lithium toward the outer side of the recessed part can be suppressed because of the difference in level at this recessed part, so that substantially no lithium alloy layer is formed in the peripheral portion of the metal plate.

Furthermore, by providing the recessed part in the metal plate, a depression at the recessed part and the volume increase caused by the formation of the lithium alloy layer cancel out, so that a negative electrode having a thickness close to an initially designed value can be formed, resulting in a preferable battery in terms of design. The thickness of the metal plate at the recessed part is not specifically limited, but preferably is 25% to 95% of the thickness of the peripheral portion when considering a composition of the lithium alloy layer to be formed and the volume increase at the time of forming the lithium alloy layer.

The above-described metal plate may be formed as one piece with the metal container. For example, it can be a plate made of the element that can be alloyed with lithium described above attached by pressure or welded to the metal container or a clad material with a member constituting the metal container (for example, a clad plate of nickel-stainless steel-aluminum).

In addition, the formation of the lithium alloy layer can be suppressed by providing a processing for preventing wetting with the electrolytic solution such as an application of a sealing agent to the peripheral portion of the metal plate or by placing a seating, which will be described later.

For the positive electrode, on the other hand, a metal oxide, a metal chalcogenide, an organic sulfur compound, an electrically conductive polymer and a carbonaceous material can be used as an active material.

The metal oxide can be, for example, transition metal oxides such as manganese oxide, vanadium oxide and niobium oxide and composite oxides containing lithium such as lithium cobalt oxide, lithium nickel oxide, lithium niobium oxide, lithium manganese oxide ($LiMn_2O_4$, $LiMn_3O_6$, $LiMnO_2$ and the like), lithium titanium oxide ($Li_{4/3}Ti_{5/3}O_4$ and the like). An oxide obtained by substituting a part of elements constituting these composite oxides for other elements such as $Li_{1+x}Ni_{1/2-y+z}Mn_{1/2-y-z}Co_{2y}O_2$ also can be used.

Furthermore, metal sulfides such as titanium disulfide, molybdenum disulfide, lithium sulfide and nickel sulfide mainly can be used as the metal chalcogenide. A lithium sulfide that is soluble in the electrolytic solution also can be used in a dissolved form in the electrolytic solution.

Moreover, for example, a chemical compound characterized by a disulfide bond mainly having carbon and sulfur, represented by a general formula of $CS_f$, preferably can be used as the organic sulfur compound.

In addition, polyaniline, polyacetylene and polypyrrole can be used, for example, as the electrically conductive polymer.

As in the negative electrode, the positive electrode is produced by using the above-described material for the active material for positive electrode alone, forming an active material layer on an electrically conductive base material such as a metal foil or a metal plate, or forming a compact of a mixture with the binder etc. In addition, as in the active material for negative electrode, the content of lithium may be adjusted suitably.

In the present invention, a preferable range of the capacity ratio of the negative electrode and the positive electrode varies depending on a combination of the active material for negative electrode and that for positive electrode. When a metal oxide is used for the positive electrode and a lithium alloy or an oxide of an element that can be alloyed with lithium is used for the negative electrode, the ratio of the negative electrode capacity with respect to the positive electrode capacity (negative electrode capacity/positive electrode capacity) preferably is at least about 1.2, more preferably at least 1.39 and preferably is not greater than 2, more preferably not greater than 1.73. In other words, the negative electrode is made to have a capacity of at least 1.2 times as large as that of the positive electrode, thereby preventing a formation of fine powder of the negative electrode due to charging and discharging, which lowers the electrical conductivity, or an excessive intake of the electrolytic solution into the negative electrode, which makes the discharging difficult. Also, the negative electrode is formed to have a capacity of not greater than twice as large as that of the positive electrode, thereby preventing a change in a crystal structure of the active material for positive electrode during over-discharging, which makes charging and discharging impossible. In addition, it is preferable in terms of securing cycle characteristics that this ratio of negative electrode capacity with respect to positive electrode capacity (negative electrode capacity/positive electrode capacity) is at least 1.39, and it is preferable in terms of securing discharge capacity of the battery that this ratio is not greater than 1.73.

By using the negative electrode and the positive electrode described above, a flat-shaped nonaqueous electrolyte battery is assembled in the following manner. First, the negative electrode is arranged on the inner bottom surface of the metal container, a separator is placed thereon, and then the positive electrode is arranged on the side of the sealing plate. The connection between the negative electrode and the metal container and that between the positive electrode and the sealing plate are achieved by crimping or welding them into one piece or by making contact via an electrically conductive agent such as a carbon paste.

According to the structure of the battery of the present invention, the volume ratio of the gasket is reduced compared with the conventional structure, and the peripheral portion of the negative electrode is located between the inner bottom surface of the metal container and the gasket. With this structure, it is possible to increase the negative electrode capacity without decreasing the capacity of the battery, thus improving its cycle characteristics considerably. Furthermore, when reducing the volume ratio of the gasket, the sealing performance of the gasket generally lowers so as to deteriorate sealing characteristics, causing electrolytic solution to leak out or dissipate from the battery more easily. However, in the present invention, the gasket is fixed well by the peripheral portion of the negative electrode that is arranged between the inner bottom surface of the metal container and the gasket. This achieves a closer contact between the gasket and the metal container and that between the gasket and the sealing plate, so that the problems described above do not occur easily.

In the present invention, the peripheral portion of the negative electrode is arranged between the inner bottom surface of the metal container and the gasket. However, the peripheral portion of the negative electrode does not have to contact directly the inner bottom surface of the metal container and the gasket. For example, a separator or a seating, which will be described in the following, may be arranged between the negative electrode and the metal container or the negative electrode and the gasket.

In the present invention, for the purpose of further improving cycle characteristics and reliability by preventing the change in shape of the negative electrode or the positive electrode with charging and discharging or suppressing the formation of the lithium alloy layer in the peripheral portion of the metal plate in the case of using the lithium alloy for the negative electrode, a member for keeping shape, so called, a seating may be arranged in the peripheral portion of the negative electrode or the positive electrode. The material and shape of the seating are not specifically limited, but it is preferable that the seating is usually made of metal such as nickel or stainless steel and has, for example, a washer-like shape or a ring shape with an L-shaped or inverted-L-shaped cross-section.

As the separator, micropore resin films or nonwoven fabric can be used. Other than polyolefin such as polyethylene and polypropylene, the material for the separator includes, for example, polyphenylene sulfide (PPS), polyether ether ketone (PEEK), polybutylene terephthalate (PBT) and fluoroplastics such as tetrafluoroethyleneperfluoroalkoxyethylene copolymer (PFA) for achieving heat resistance. In particular, a multilayered separator formed by layering a plurality of the micropore films and the nonwoven fabric sheets made of the above-mentioned materials, layering a plurality of the micropore films, or layering a plurality of the nonwoven fabric sheets is used preferably. The reason for this is that, when the present invention makes it possible to reduce the electrolytic solution amount compared with the conventional structure as described later, the above-described multilayered separator can satisfy easily the demand for better liquid retention performance of the separator and for maintaining stability in the case of using a large capacity active material.

The arrangement of the separator is not specifically limited as long as the contact of the negative electrode and the positive electrode can be prevented. However, if the peripheral edge portion of the separator is inserted between the gasket and the negative electrode, the separator is not displaced easily at the time of assembling the battery. Furthermore, if the peripheral edge portion of the separator is fixed by the sealing plate and the gasket, it is possible to prevent the displacement of the separator more effectively.

Although the nonaqueous electrolyte can be either a nonaqueous liquid electrolyte or polymer electrolyte, the liquid electrolyte, which is called an electrolytic solution in general, is used frequently. Therefore, this liquid electrolyte will be referred to as "the electrolytic solution" and described more in detail in the following. As the nonaqueous electrolytic solution, an organic solvent-based electrolytic solution prepared by dissolving an electrolytic salt such as lithium salt in an organic solvent can be used preferably. The organic solvent to be used as such a solvent for this electrolytic solution includes, for example, γ-butyrolactone, 1,2-dimethoxyethane, 1,2-diethoxyethane, tetrahydrofuran, dioxolane, an organic solvent containing fluorine such as fluorobenzene, difluoroanisole and trifluorotoluene, cyclic carbonate such as propylene carbonate, ethylene carbonate and butylene carbonate, and linear carbonate such as diethylcarbonate, dimethylcarbonate and ethylmethylcarbonate. These solvents can be used alone or as a mixed solvent of two or more solvents. The electrolytic salt such as lithium salt can include, for example, $LiN(CF_3SO_2)_2$, $LiClO_4$, $LiBF_4$, $LiPF_6$, $LiAsF_6$, $LiSbF_6$, $LiCF_3SO_3$, $LiCF_3CO_2$, $LiC_nF_{2n+1}SO_3$ ($n \geq 2$) and $LiN(CF_3CF_2SO_2)_2$. Moreover, a solid polymer electrolyte in which an electrolytic salt is supported by a polymer support and a gel polymer electrolyte obtained by gelation of an electrolyte with a polymer also can be used as the above nonaqueous electrolyte.

Other than polypropylene and nylon, the gasket can be made of, for example, polyphenylene ether (PPE), polysulfone (PSF), polyalylate (PAR), polyethersulfone (PES), polyphenylene sulfide (PPS), polyether ether ketone (PEEK) or fluoroplastics such as tetrafluoroethyleneperfluoroalkoxyethylene copolymer (PFA) for achieving heat resistance.

The battery is sealed by pressing inward an edge portion of an opening of the metal container tightly. At this time, it is preferable that the periphery of the sealing plate is folded back because this achieves a closer contact between the gasket and the sealing plate, improving the leakproof characteristics. Although the shape of the gasket is not specifically limited, it is preferable that a corner of the peripheral surface of the gasket contacting an inner side of the opening edge of the metal container is formed to be a curved surface or this corner is provided with a chamfered surface (cut off to form a flat surface) for the purpose of preventing the gasket from protruding from the opening edge of the metal container at the time of sealing so as to impair the sealing performance. Furthermore, by forming the corner of the gasket facing the negative electrode to be a curved surface or providing this corner with a chamfered surface, it is possible to prevent the peripheral edge portion of the separator from getting caught between the metal container and the gasket and then cut off. In addition, by providing an upper portion of the gasket that the folded back portion on the periphery of the sealing plate contacts with a projected part on which an upper edge of the folded back portion can be hooked, it is possible to fix the sealing plate and the gasket more securely.

In a flat-shaped nonaqueous electrolyte battery with the conventional structure, the amount of an electrolytic solution per area of an opposing surface of the negative electrode (the area on the side opposing the positive electrode) that is required for designing a battery is about 40 to 50 $\mu l/cm^2$. On the other hand, in the flat-shaped nonaqueous electrolyte battery of the present invention, an increase in the capacity ratio of the negative electrode reduces a charge depth or a discharge depth of the negative electrode during the charge-discharge cycles, and in particular, a degradation of the negative electrode in the case of using the lithium alloy is suppressed. Thus, the battery can function sufficiently even with a small electrolytic solution amount of about 10 to 40 $\mu l/cm^2$.

Next, the present invention will be described more specifically by way of examples. However, it should be understood that the present invention is not limited to these examples.

EXAMPLE 1

A positive electrode was produced in the following manner. First, 100 parts by weight of $LiMn_3O_6$ powder, 5 parts by weight of carbon black as an electrical conductivity auxiliary agent, 5 parts by weight of scale-like graphite also as an electrical conductivity auxiliary agent and 0.7 parts by weight of polytetrafluoroethylene as a binder were mixed, dried and then formed by pressure into a pellet shape 4.8 mm in diameter and 0.46 mm in thickness. This pellet was dried at 250° C. for 12 hours in an electric drying oven so as to be dehydrated, thus obtaining a positive electrode with a capacity of 4.0 mAh.

An lithium-aluminum alloy was used for a negative electrode. Using a current collector mesh for improving a current collecting efficiency, this negative electrode was produced in the following manner. First, a current collector mesh made of stainless steel was punched out into a disc shape 6.1 mm in diameter and resistance-welded to an inner bottom surface of a stainless steel container (whose material was SUS444) 6.5 mm in outer diameter. Then, an aluminum plate (flat plate) that had been punched out into a disc shape 6.1 mm in diameter and 0.31 mm in thickness was attached by pressure to this current collector mesh. Thereafter, a disc-shaped lithium plate 5.0 mm in diameter and 0.15 mm in thickness was placed on this aluminum plate, thus obtaining a negative electrode with a capacity of 6.2 mAh.

Figure 2:
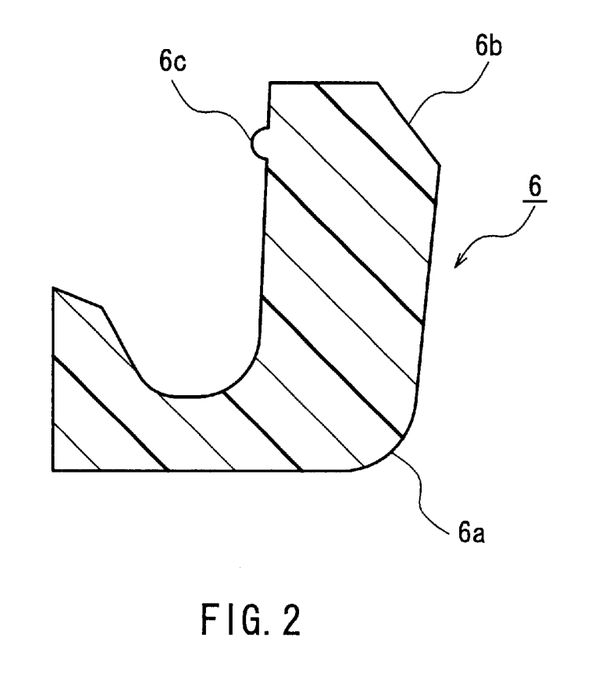
FIG. 2 schematically shows a cross-section of a main portion of a gasket used in the battery of one embodiment of the present invention.

As a nonaqueous electrolyte, an electrolytic solution obtained by dissolving 0.6 mol/l of $LiPF_6$ in a solvent in which propylene carbonate and 1,2-dimethoxyethane were mixed in a volume ratio of 2:1 was used, and the amount of the electrolytic solution was 7 $\mu l$. This electrolytic solution amount was 24 l/cm$^2$ when expressed by a value per area of the opposing surface of the negative electrode. A three-layer separator formed of polypropylene nonwoven fabric sheet-micropore polypropylene film-polypropylene nonwoven fabric sheet was used as the separator, and a gasket having a main portion, whose cross-section is shown in FIG. 2, was used as the gasket. In this embodiment, the gasket was formed from polypropylene. This gasket 6 is a ring shaped body although only a part thereof is shown in FIG. 2. A corner thereof on a peripheral side facing the negative electrode had a curved surface 6a, while a corner thereof on the peripheral side contacting an inner side of an opening edge of the metal container was provided with a chamfered surface 6b. Furthermore, an upper portion of the gasket is provided with a projected part 6c on which an upper edge of a folded back portion on the periphery of a sealing plate can be hooked.

Figure 1:
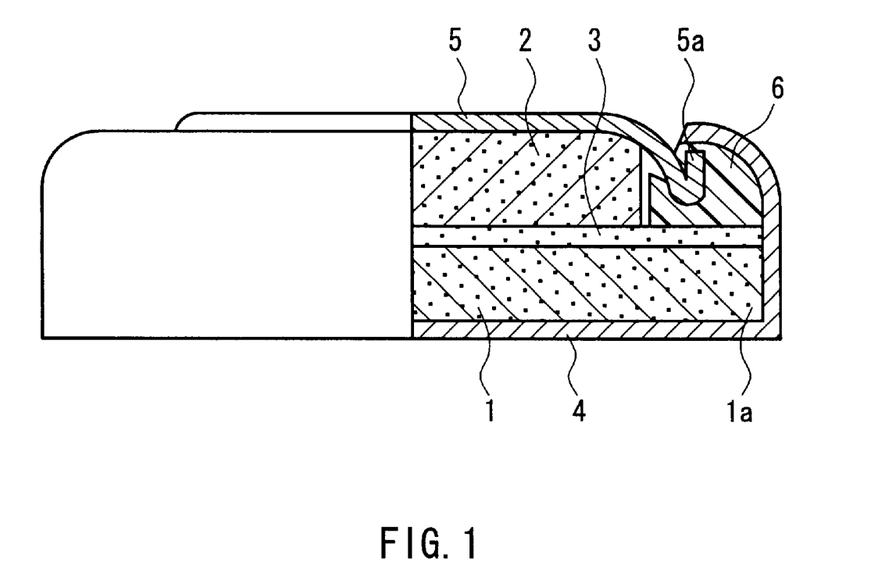
FIG. 1 schematically shows a partial cross-section of a flat-shaped nonaqueous electrolyte battery according to one embodiment of the present invention.

Using the positive electrode, the negative electrode, the separator, the gasket, the nonaqueous electrolyte and the sealing plate made of stainless steel (whose material was SUS444), a flat-shaped nonaqueous electrolyte battery 6.5 mm in outer diameter and 1.4 mm in height was assembled as shown in FIG. 1. This battery had a ratio of a capacity of the negative electrode (referred to as a "negative electrode capacity" in the following) with respect to a capacity of the positive electrode (referred to as a "positive electrode capacity" in the following) (negative electrode capacity/positive electrode capacity) was 1.55. Furthermore, this battery of Example 1 was, so-called, a "button-type" battery and was a small battery having an outer diameter of 6.5 mm and a height of 1.4 mm.

The following is a description of the structure of this battery of Example 1 referring to FIG. 1. Numeral 1 denotes the negative electrode described above, which is contained in a metal container 4. The metal container 4 is made of stainless steel as described above and also serves as a negative electrode terminal. Although a current collector mesh is welded to the inner bottom surface of the metal container 4, this current collector mesh is not shown in this figure.

On the other hand, a positive electrode 2 is contained in a sealing plate 5, which is made of stainless steel and also serves as a positive electrode terminal. Although the positive electrode 2 and the sealing plate 5 are connected via a carbon paste that is applied therebetween for the purpose of reducing contact resistance, this carbon paste is not shown in this figure.

Furthermore, a separator 3 is arranged between the negative electrode 1 and the positive electrode 2. A peripheral edge portion of this separator 3 and a peripheral portion 1a of the negative electrode 1 are both arranged between the inner bottom surface of the metal container 4 and the gasket 6. By a tight inward pressure applied to an edge portion of an opening of the metal container 4, this gasket 6 is pressed to contact a folded back portion 5a on a periphery of the sealing plate 5 and an inner side of the edge portion of the opening of the metal container 4, thus achieving a sealed structure inside the battery.

Incidentally, FIG. 1 schematically illustrates the battery structure but does not show all the constituent members as described above. For example, this figure does not show the nonaqueous electrolyte (the electrolytic solution) for reasons of clarity. Moreover, for producing the negative electrode 1, an aluminum plate and a lithium plate were layered by alloying them electrochemically in the presence of the electrolytic solution after assembling the battery, so that a lithium-aluminum alloy layer is formed on the aluminum plate. This step is not shown in FIG. 1. In addition, the gasket 6 is deformed by the tight inward pressure to the edge portion of the opening of the metal container 4 so as to seal a gap between the edge portion of the opening of the metal container 4 and the folded back portion 5a on the periphery of the sealing plate 5, thus achieving a sealed structure inside the battery. Accordingly, FIG. 1 does not show the details of the gasket 6 as in FIG. 2.

EXAMPLE 2

Figure 3:
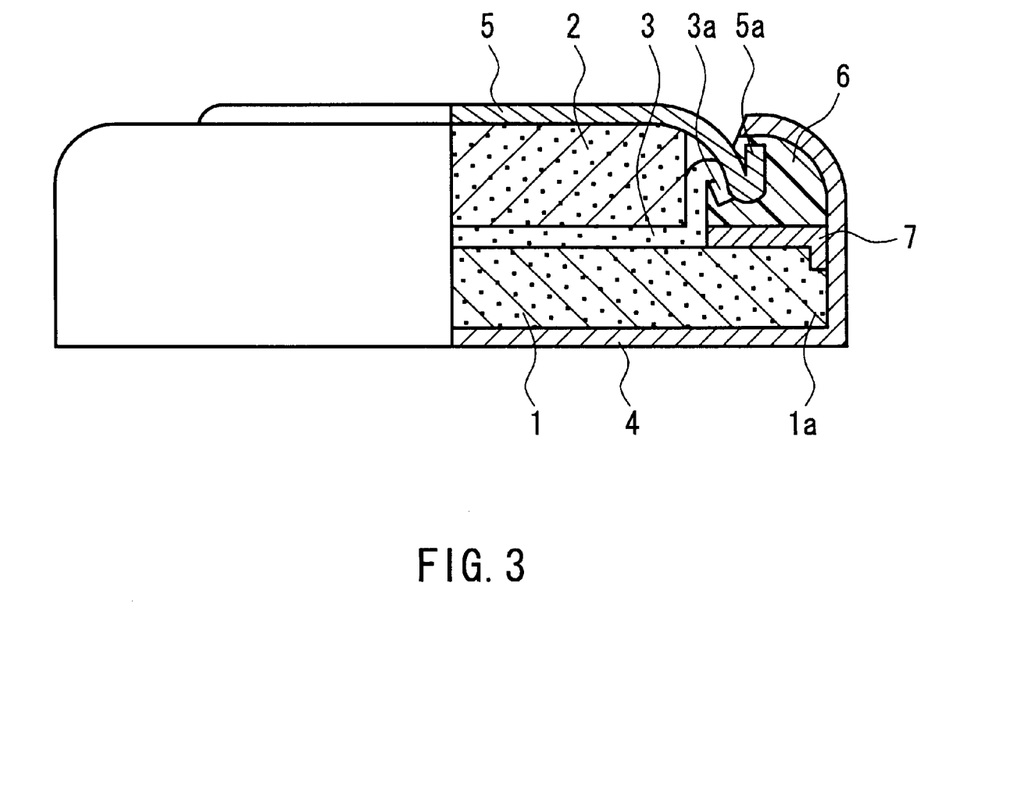
FIG. 3 schematically shows a partial cross-section of a flat-shaped nonaqueous electrolyte battery according to another embodiment of the present invention.

A flat-shaped nonaqueous electrolyte battery 6.5 mm in outer diameter and 1.4 mm in height shown in FIG. 3 was produced in the same manner as that in Example 1 except that the battery was assembled so that a ring-shaped seating that was made of stainless steel and had an inverted-L-shaped cross-section was placed in the peripheral portion of the negative electrode and the peripheral edge portion of the separator was sandwiched and fixed between the sealing plate and the gasket.

The following is a description of the structure of this battery of Example 2 referring to FIG. 3. The above-mentioned seating 7 is disposed between the peripheral portion 1a of the negative electrode 1 and the gasket 6, and a peripheral edge portion 3a of the separator 3 is sandwiched and fixed between the gasket 6 and the folded back portion 5a on the periphery of the sealing plate 5. Other structures are substantially the same as that of the above-described battery of Example 1 shown in FIG. 1.

EXAMPLE 3

A positive electrode was produced in the same manner as that in Example 1 except that the positive electrode had a pellet shape 4.8 mm in diameter and 0.48 mm in thickness and a capacity of 4.2 mAh.

Figure 4:
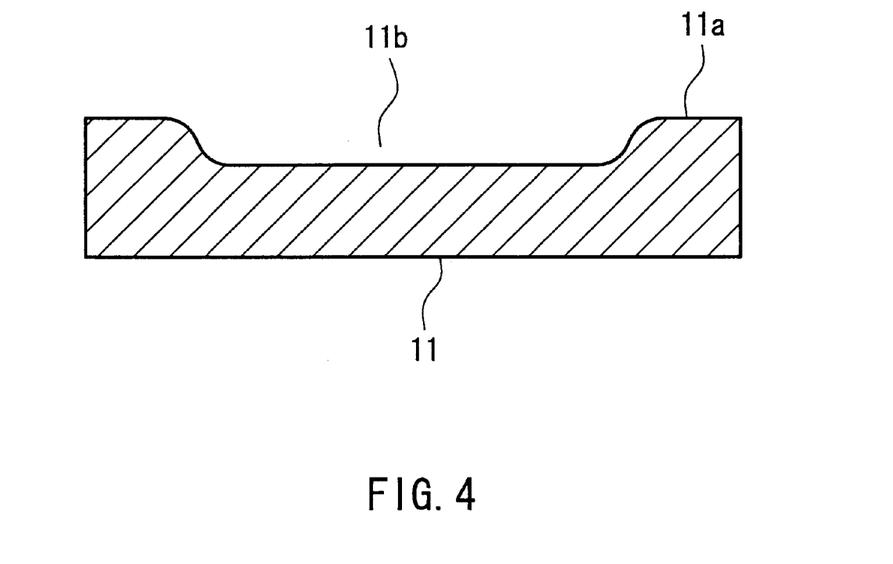
FIG. 4 schematically shows a cross-section of an aluminum plate used for a negative electrode of a flat-shaped nonaqueous electrolyte battery according to another embodiment of the present invention.

A negative electrode was produced in the following manner. First, a current collector mesh made of stainless steel was punched out into a disc shape 6.25 mm in diameter and resistance-welded to an inner bottom surface of a stainless steel container (whose material was SUS444) 6.5 mm in outer diameter. Then, an aluminum plate 11 having a cross-section as shown in FIG. 4 was attached by pressure to this current collector mesh. This aluminum plate 11 had a disc shape 6.4 mm in diameter and 0.35 mm in thickness of the peripheral portion 11a and was provided with a recessed part 11b 5.2 mm in diameter in its central portion. The recessed part 1ib of this aluminum plate 11 had a thickness of 0.25 mm, that is, 71% of the thickness of the peripheral portion, and it had a diameter that was 81% of the outer diameter of the aluminum plate 11. Furthermore, a disc-shaped lithium plate 4.7 mm in diameter and 0.18 mm in thickness was placed in this recessed part 11b of the aluminum plate 11, thus obtaining a negative electrode with a capacity of 6.5 mAh.

Using the positive electrode and the negative electrode described above, a flat-shaped nonaqueous electrolyte battery 6.5 mm in outer diameter and 1.4 mm in height was produced so as to have the same structure as that in Example 1 except that the electrolytic solution amount was 7.2 µl. In this battery, the electrolytic solution amount per area of the opposing surface of the negative electrode was 22 µl/cm².

COMPARATIVE EXAMPLE 1

A current collector mesh made of stainless steel was punched out into a disc shape 4.0 mm in diameter and resistance-welded to an inner surface of the sealing plate, which was the same as that in Example 1. Then, an aluminum plate that had been punched out into a disc shape 4.0 mm in diameter and 0.24 mm in thickness was attached by pressure to this current collector mesh. Thereafter, a disc-shaped lithium plate 4.0 mm in diameter and 0.18 mm in thickness was placed thereon, thus obtaining a negative electrode with a capacity of 4.7 mAh.

Next, after a carbon paste was applied onto the inner bottom surface of the metal container, which was the same as that in Example 1, the positive electrode, which also was the same as that in Example 1, was placed. A flat-shaped nonaqueous electrolyte battery 6.5 mm in outer diameter and 1.4 mm in height with substantially the same structure as that in Example 1, which is shown in FIG. 5, was produced except that 6 µl of the electrolytic solution was filled. In this battery, the electrolytic solution amount per area of the opposing surface of the negative electrode was 48 µl/cm².

In this battery of Comparative example 1, the sealing plate 5 also served as the negative electrode terminal because the negative electrode 1 was contained in the sealing plate 5 as described above, while the metal container 4 also served as the positive electrode terminal because the positive electrode 2 was contained in the metal container 4. Since the lower portion of the gasket 6 reached the inner bottom surface of the metal container 4, the volume ratio of the gasket 6 with respect to the battery was larger than those in the batteries of Examples 1 to 3, so that the volume ratio of the electrodes were smaller. Furthermore, the gasket 6 used in the battery of Comparative example 1 was not provided with the curved surface 6a on the corner on the peripheral side as shown in FIG. 2 or the projected part 6c on which the upper edge of the folded back portion 5a on the periphery of the sealing plate 5 can be hooked.

Since this battery of Comparative example 1 achieved a higher capacity using the same positive electrode as that in Example 1, the filling amount of the negative electrode had to be reduced by an increase in the filling amount of the positive electrode. Accordingly, the ratio of the negative electrode capacity with respect to the positive electrode capacity (negative electrode capacity/positive electrode capacity) was as small as 1.18.

COMPARATIVE EXAMPLE 2

A flat-shaped nonaqueous electrolyte battery 6.5 mm in outer diameter and 1.4 mm in height was produced in the same manner as that in Comparative example 1 except that the positive electrode that was formed by pressure into a pellet shape 4.8 mm in. diameter and 0.39 mm in thickness and had a capacity of 3.4 mAh and the negative electrode that was obtained by disposing a disc-shaped lithium plate 4.0 mm in diameter and 0.2 mm in thickness on an aluminum plate punched out into a disc shape 4.0 mm in diameter and 0.28 mm in thickness and had a capacity of 5.2 mAh were used. This battery of Comparative example 2 had a ratio of the negative electrode capacity with respect to the positive electrode capacity (negative electrode capacity/positive electrode capacity) of 1.53.

This battery of Comparative example 2 was a battery in which the filling amounts of the positive electrode and the negative electrode were adjusted so that the ratio of the negative electrode capacity with respect to the positive electrode capacity (negative electrode capacity/positive electrode capacity) was substantially the same as those in the batteries of Examples 1 to 3.

A load resistance of 270 kΩ was connected to these batteries of Examples 1 to 3 and Comparative examples 1 to 2, and their discharge capacities until a battery voltage lowered down to 2.0 V were measured. Also, a charge-discharge cycle test was conducted under the following conditions, and the number of cycles in which charging and discharging were possible was examined. That is, the battery was charged for 15 hours by connecting a 2.4 kΩ current limiter and applying a power supply voltage of 3.25 V, while the battery was discharged for 16 hours by connecting a 27 kΩ load resistance. Furthermore, a cycle life was judged from the battery voltage after 11 hours of discharging, and the time when this voltage reached a value lower than 2 V was considered this battery's lifetime. The number of cycles at this time was considered the number of cycles in which charging and discharging were possible. The result of these measurements is shown in Table 1 along with the ratio of the negative electrode capacity with respect to the positive electrode capacity and the electrolytic solution amount per area of the opposing surface of the negative electrode. In Table 1, the ratio of the negative electrode capacity with respect to the positive electrode capacity is expressed by a "capacity ratio (negative electrode capacity/positive electrode capacity)."

TABLE 1

|  | Capacity ratio (negative electrode capacity/ positive electrode capacity) | Electrolytic solution amount per area of opposing surface of negative electrode (µl/cm²) | Discharge capacity (mAh) | Number of cycles in which charging and discharging were possible (times) |
| --- | --- | --- | --- | --- |
| Example 1 | 1.55 | 24 | 3.6 | 60 |
| Example 2 | 1.55 | 24 | 3.6 | 60 |
| Example 3 | 1.55 | 22 | 3.6 | 74 |
| Comparative example 1 | 1.18 | 48 | 3.5 | 9 |
| Comparative example 2 | 1.53 | 48 | 3.0 | 28 |

As shown in Table 1, the batteries of Examples 1 to 3 had a large discharge capacity and a large number of cycles in which charging and discharging were possible, achieving excellent cycle characteristics. In other words, in the batteries of Examples 1 to 3 of the present invention, by arranging the positive electrode on the side of the sealing plate and the negative electrode on the side of the metal container and the peripheral portion of the negative electrode between the inner bottom surface of the metal container and the gasket, it was possible to increase the negative electrode capacity without reducing the positive electrode capacity and suppress the degradation of the negative electrode due to the charge-discharge cycles, thereby achieving a flat-shaped nonaqueous electrolyte battery that had a small size, a high capacity and excellent cycle characteristics. In addition, although the batteries of Examples 1 to 3 had a smaller volume ratio of the gasket inside the battery than the batteries of Comparative examples 1 to 2, no leakage occurred even after repeated charging and discharging.

On the other hand, in the battery of Comparative example 1 that achieved a higher capacity with the conventional structure, because of a rapid degradation of the negative electrode during the charge-discharge cycles, the number of cycles in which charging and discharging were possible decreased considerably. Also, in the battery of Comparative example 2 in which the filling amounts of the positive electrode and the negative electrode were adjusted so that the capacity ratio (negative electrode capacity/positive electrode capacity) was substantially the same as those in the batteries of Examples 1 to 3, the discharge capacity lowered, and this made the discharge depth during the charge-discharge cycles larger than those of the batteries of Examples 1 to 3, leading to a smaller number of cycles in which charging and discharging were possible.

Next, the changes in sealing performance of the battery caused by arranging the seating in the peripheral portion of the negative electrode and using a metal plate whose central portion is thinner than its peripheral portion for the negative electrode were examined. In other words, 100 batteries for each of the flat-shaped nonaqueous electrolyte batteries of Examples 1 to 3 were used and allowed to stand at 85° C. at a humidity of 90% for 20 days for a leakproof characteristics testing under high temperature and high humidity. The result is expressed as the number of the batteries that leaked and shown in Table 2.

TABLE 2

|  | Number of the batteries that leaked |
| --- | --- |
| Example 1 | 15 |
| Example 2 | 0 |
| Example 3 | 0 |

As shown in Table 2, for the battery of Example 2 in which the seating was arranged in the peripheral portion of the negative electrode and the battery of Example 3 in which an aluminum plate whose central portion has a recessed part was used, no leakage occurred in any of the 100 samples. On the other hand, for the battery of Example 1 in which lithium simply was placed on a flat aluminum plate, leakage occurred in 15 out of the 100 samples. In order to examine the cause of the leakage, the batteries of Examples 1 to 3 were disassembled after the leakproof characteristics test, and the cross-sections thereof were observed. Then, it was found out that, in the leaked batteries, the lithium alloy layer in a part of the peripheral portion of the aluminum plate was thicker than that in other parts, and the gasket was deformed in this part, causing the electrolytic solution to leak out. The lithium alloy layer was formed unevenly in the peripheral portion of the aluminum plate probably because, in the process of arranging the lithium plate on the aluminum plate, the centers of the aluminum plate and the lithium plate did not match perfectly, so that the lithium plate was arranged in a position that was slightly displaced from the center of the aluminum plate. On the other hand, in the batteries of Examples 2 and 3, no lithium alloy layer was formed unevenly as described above, and the formation of the lithium alloy layer in the peripheral portion of the aluminum plate was suppressed effectively. Thus, by suppressing the formation of the lithium alloy layer in the peripheral portion of the metal plate, it was possible to provide a highly reliable flat-shaped nonaqueous electrolyte battery that can maintain an excellent leakproof performance of the battery even with variation occurred in the assembling process of the battery.

EXAMPLE 4

A positive electrode was produced in the same manner as that in Example 1 except that it had a pellet shape 9.3 mm in diameter and 0.64 mm in thickness and a capacity of 18.3 nMAh.

A negative electrode was produced in the same manner as that in Example 1 except that it used a container 12.0 mm in outer diameter, a current collector mesh 10.5 mm in diameter, an aluminum plate 11.7 mm in diameter and 0.35 mm in thickness and a lithium plate 9.5 mm in diameter and 0.19 mm in thickness and had a capacity of 27.8 mAh.

By combining the positive electrode and the negative electrode described above, a flat-shaped nonaqueous electrolyte battery 12.0 mm in outer diameter and 2.0 mm in height was assembled in the same manner as that in Example 1. The negative electrode capacity/positive electrode capacity of this battery was 1.52.

EXAMPLE 5

A positive electrode was produced in the same manner as that in Example 1 except that it had a pellet shape 16.1 mm in diameter and 0.98 mm in thickness and a capacity of 78.6 mAh.

A negative electrode was produced in the same manner as that in Example 1 except that it used a container 20.0 mm in outer diameter, a current collector mesh 18.8 mm in diameter, an aluminum plate 19.0 mm in diameter and 0.7 mm in thickness and a lithium plate 16.0 mm in diameter and 0.29 mm in thickness and had a capacity of 120.3 mAh.

By combining the positive electrode and the negative electrode described above, a flat-shaped nonaqueous electrolyte battery 20.0 mm in outer diameter and 3.2 mm in height was assembled in the same manner as that in Example 1. The negative electrode capacity/positive electrode capacity of this battery was 1.53.

COMPARATIVE EXAMPLE 3

A positive electrode was produced in the same manner as that in Comparative example 2 except that it had a pellet shape 8.9 mm in diameter and 0.63 mm in thickness and a capacity of 16.1 mAh.

A negative electrode was produced in the same manner as that in Comparative example 2 except that it used a current collector mesh 8.6 mm in diameter, an aluminum plate 9.0 mm in diameter and 0.35 mm in thickness and a lithium plate 8.7 mm in diameter and 0.2 mm in thickness and had a capacity of 24.5 mAh.

By combining the positive electrode and the negative electrode described above and using a container 12.0 mm in outer diameter, a flat-shaped nonaqueous electrolyte battery 12.0 mm in outer diameter and 2.0 mm in height was assembled in the same manner as that in Comparative example 2. The negative electrode capacity/positive electrode capacity of this battery was 1.52.

COMPARATIVE EXAMPLE 4

A positive electrode was produced in the same manner as that in Comparative example 2 except that it had a pellet shape 15.2 mm in diameter and 0.95 mm in thickness and a capacity of 71.0 mAh.

A negative electrode was produced in the same manner as that in Comparative example 2 except that it used a current collector mesh 14.9 mm in diameter, an aluminum plate 15.0 mm in diameter and 0.7 mm in thickness and a lithium plate 14.5 mm in diameter and 0.32 mm in thickness and had a capacity of 109.0 mAh.

By combining the positive electrode and the negative electrode described above and using a container 20.0 mm in outer diameter, a flat-shaped nonaqueous electrolyte battery 20.0 mm in outer diameter and 3.2 mm in height was assembled in the same manner as that in Comparative example 2. The negative electrode capacity/positive electrode capacity of this battery was 1.54.

The above-described batteries of Examples 4 and 5 are flat-shaped nonaqueous electrolyte batteries with the same structure as that of the battery of Example 1 and having a diameter of 12.0 mm and 20.0 mm, respectively.

The above-described batteries of Comparative examples 3 and 4 are flat-shaped nonaqueous electrolyte batteries with the same structure as that of the battery of Comparative example 2 and having a diameter of 12.0 mm and 20.0 mm, respectively.

A load resistance of 70 kΩ was connected to the batteries of Example 4 and Comparative example 3, and their discharge capacities until a battery voltage lowered down to 2.0 V were measured. A load resistance of 20 kΩ was connected to the batteries of Example 5 and Comparative example 4, and their discharge capacities until a battery voltage lowered down to 2.0 V were measured. The result of these measurements is shown in Table 3 along with the discharge capacities of the batteries of Example 1 and Comparative example 2. Moreover, in Table 3, the discharge capacities of the batteries of Examples 1, 4 and 5 and the discharge capacities of the corresponding batteries of Comparative examples (Comparative examples 2, 3 and 4) are compared, and their ratios of increase [(Discharge capacity of Example—Discharge capacity of Comparative example)×100/ Discharge capacity of Comparative example] (%) are shown as the "increase ratio of the discharge capacity."

TABLE 3

|  | Capacity ratio | Battery diameter (mm) | Discharge capacity (mAh) | Increase ratio of discharge capacity (%) |
|---|---|---|---|---|
| Example 1 | 1.55 | 6.5 | 3.6 | 20 (with respect to Comparative example 2) |
| Example 4 | 1.52 | 12.0 | 15.9 | 14 (with respect to Comparative example 3) |
| Example 5 | 1.53 | 20.0 | 68.6 | 10 (with respect to Comparative example 4) |
| Comparative example 2 | 1.53 | 6.5 | 3.0 | — |
| Comparative example 3 | 1.52 | 12.0 | 14.0 | — |
| Comparative example 4 | 1.54 | 20.0 | 62.1 | — |

As shown in Table 3, although the batteries of Examples 1, 4 and 5 and Comparative examples 2 to 4 were designed to have substantially the same negative electrode capacity/positive electrode capacity, the batteries of Examples 1, 4 and 5 were able to achieve a larger discharge capacity than the corresponding batteries of Comparative examples. Furthermore, the increase ratio of the discharge capacity augmented as the battery diameter decreased. It was possible to obtain a good effect of the present invention when the diameter was equal to or smaller than 16 mm, and in particular, the battery having a diameter of equal to or smaller than 8 mm produced a significant effect.

Although a minimum value of the battery diameter is not limited specifically in the present invention, a practical lower limit should be 2 mm when considering easiness of manufacturing.

COMPARATIVE EXAMPLE 5

A positive electrode was produced in the same manner as that in Example 1 except that it had a pellet shape 6.1 mm in diameter and 0.35 mm in thickness and a capacity of 4.9 mAh. Next, a carbon paste was applied to the inner bottom surface of the metal container, which was the same as that in Example 1, and then the above-mentioned positive electrode was placed thereon.

By combining the positive electrode placed in the metal container and the negative electrode attached to the sealing plate, which was the same as Comparative example 1, a flat-shaped nonaqueous electrolyte battery 6.5 mm in outer diameter and 1.4 mm in height was assembled in the same manner as that in Example 1. In other words, this battery of Comparative example 5 was a battery in which the peripheral portion of the positive electrode was arranged between the inner bottom surface of the metal container and the gasket and had a structure that the positions of the positive electrode and negative electrode were reversed compared with the battery of Example 1 of the present invention.

The negative electrode capacity/positive electrode capacity of this battery was 0.96, and the capacity of the negative electrode was smaller than that of the positive electrode. Accordingly, when the discharge capacity was measured under the same condition as that for the battery of Example 1, the battery of Comparative example 5 had a capacity (4.0 mAh) larger than that of the battery of Example 1. However, the discharge depth of the negative electrode became so large that the degradation of the negative electrode occurred. Consequently, the charge-discharge cycle characteristics of the battery of Comparative example 5 was still worse than that of the battery of Comparative example 1.

As described above, with the structure of the present invention in which the sealing plate also served as the positive electrode terminal, the metal container also served as the negative electrode terminal, and the peripheral portion of the negative electrode was arranged between the inner bottom surface of the metal container and the gasket, it was possible to provide a flat-shaped nonaqueous electrolyte battery that had a large capacity and excellent cycle characteristics. Especially when the negative electrode is obtained by forming a lithium alloy layer on a metal plate, a highly reliable battery with excellent leakproof characteristics can be obtained by suppressing the formation of the lithium alloy layer in the peripheral portion of the metal plate.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A flat-shaped nonaqueous electrolyte battery comprising:
   a sealing plate;
   a metal container;
   a gasket interposed between the sealing plate and the metal container;
   a negative electrode disposed on the metal container;
   a positive electrode disposed on the sealing plate;
   a nonaqueous electrolyte, wherein the negative electrode, the positive electrode and the nonaqueous electrolyte are sealed between the sealing plate and the metal container by pressing inward an edge portion of an opening of the metal container; and
   wherein the sealing plate also serves as a positive electrode terminal, the metal container also serves as a negative electrode terminal, and a peripheral portion of the negative electrode is arranged between an inner bottom surface of the metal container and the gasket.

2. The flat-shaped nonaqueous electrolyte battery according to claim 1, wherein the metal container has a diameter of 2 to 16 mm.

3. The flat-shaped nonaqueous electrolyte battery according to claim 1, wherein the metal container has a diameter of 2 to 8 mm.

4. The flat-shaped nonaqueous electrolyte battery according to claim 1, wherein a lithium alloy or an oxide of an element that can be alloyed with lithium is used for the negative electrode.

5. The flat-shaped nonaqueous electrolyte battery according to claim 1, wherein the negative electrode is obtained by forming a lithium alloy layer on a metal plate whose central portion is thinner than its peripheral portion.

6. The flat-shaped nonaqueous electrolyte battery according to claim 5, wherein the metal plate has a recessed part in its central portion, the recessed part having a diameter that is 70% to 90% of an outer diameter of the metal plate, and the lithium alloy layer is formed by bringing lithium into contact with the recessed part of the metal plate.

7. The flat-shaped nonaqueous electrolyte battery according to claim 6, wherein the recessed part of the metal plate has a thickness that is 25% to 95% of a thickness of the peripheral portion.

8. The flat-shaped nonaqueous electrolyte battery according to claim 1, wherein a ratio of a capacity of the negative electrode with respect to that of the positive electrode is at least 1.2.

9. The flat-shaped nonaqueous electrolyte battery according to claim 1, wherein a separator having a multilayered structure is interposed between the negative electrode and the positive electrode.

* * * * *